United States Patent [19]
Brown

[11] Patent Number: 4,697,628
[45] Date of Patent: Oct. 6, 1987

[54] VEHICLE HAVING A DUAL DRIVE WHEEL ASSEMBLY AND TRACTION DEVICE

[76] Inventor: Robert R. Brown, 14633 N. 38th St., Phoenix, Ariz. 85032

[21] Appl. No.: 809,221

[22] Filed: Dec. 16, 1985

[51] Int. Cl.$^4$ ............................................. B60C 27/04
[52] U.S. Cl. .................................. 152/213 R; 7/100; 7/138; 81/121.1; 105/29.1; 152/218; 152/220; 152/228; 180/9.21; 238/14; 301/44 T
[58] Field of Search ............... 152/220, 208, 185.1, 152/213 R, 214, 217, 218, 225 R, 225 C, 226–228; 238/14; 280/13; 180/16, 9.21, 7.1; 305/19; 301/41 R, 44 B, 44 T, 38 R, 39 R, 40 R, 40 S, 36 R; 104/307; 105/29.1; 81/121.1; 7/100, 138

[56] References Cited

U.S. PATENT DOCUMENTS

| | | | |
|---|---|---|---|
| 986,099 | 3/1911 | Sprung | 238/14 |
| 1,606,622 | 11/1926 | Fogarty | 180/7.1 X |
| 2,312,486 | 3/1943 | Riesen | 152/220 |
| 2,454,005 | 11/1948 | Pletch | 152/220 |
| 2,557,241 | 6/1951 | Silver | 152/220 |
| 2,992,863 | 7/1961 | Fredricks et al. | 152/220 X |
| 3,532,149 | 10/1970 | McCord | 152/213 R |
| 3,630,440 | 12/1971 | Sams | 238/14 |
| 3,672,422 | 6/1972 | Greipel | 152/222 |
| 3,750,734 | 8/1973 | McCord | 152/220 |
| 4,459,716 | 7/1984 | Valadez | 81/121.1 X |

Primary Examiner—Donald E. Czaja
Assistant Examiner—Thomas Bokan
Attorney, Agent, or Firm—Richard R. Mybeck

[57] ABSTRACT

A traction device for use in extracting mired dual wheeled vehicles from a mired condition comprising a block assembly having a plurality of tower members for attachment to and between the wheels of the mired vehicle and a plate assembly for operative engagement by a rotating block assembly to move the mired vehicle to a freed location. The tower assemblies can be quickly dismantled to a transportable size, and readily assembled and installed for needed operation.

7 Claims, 11 Drawing Figures

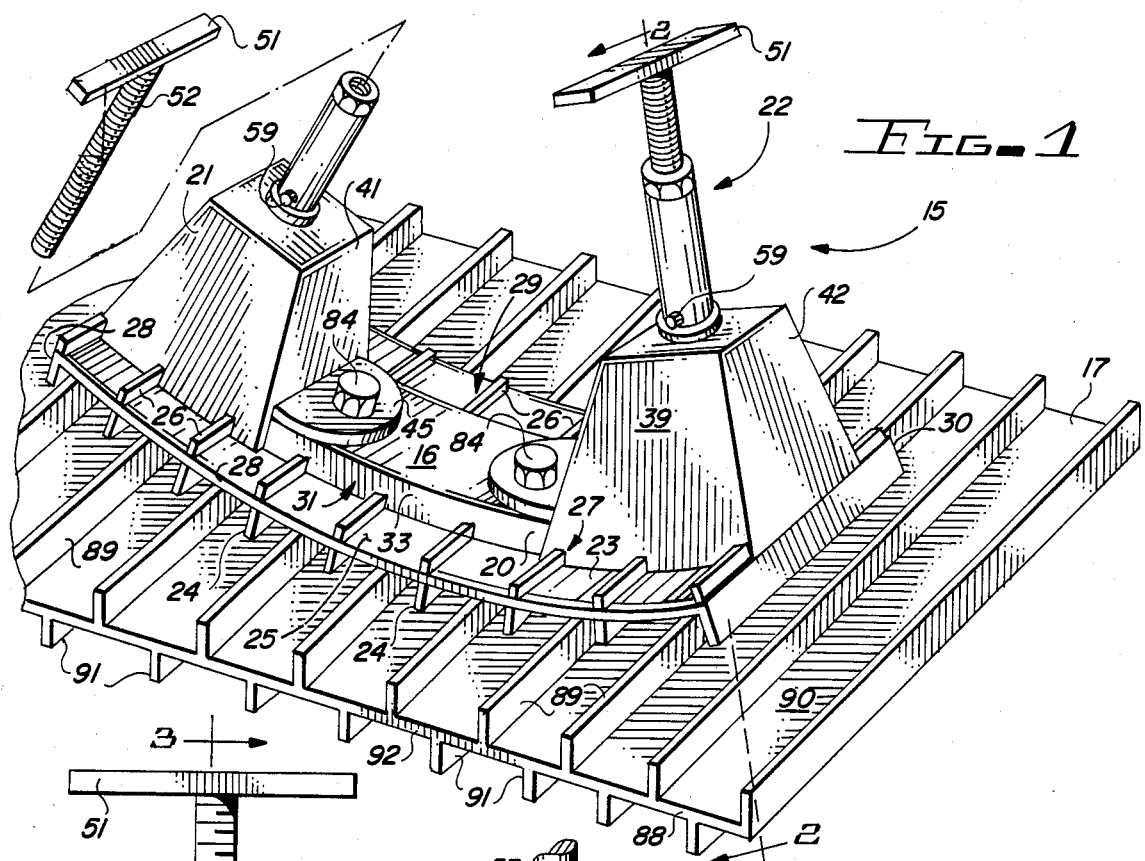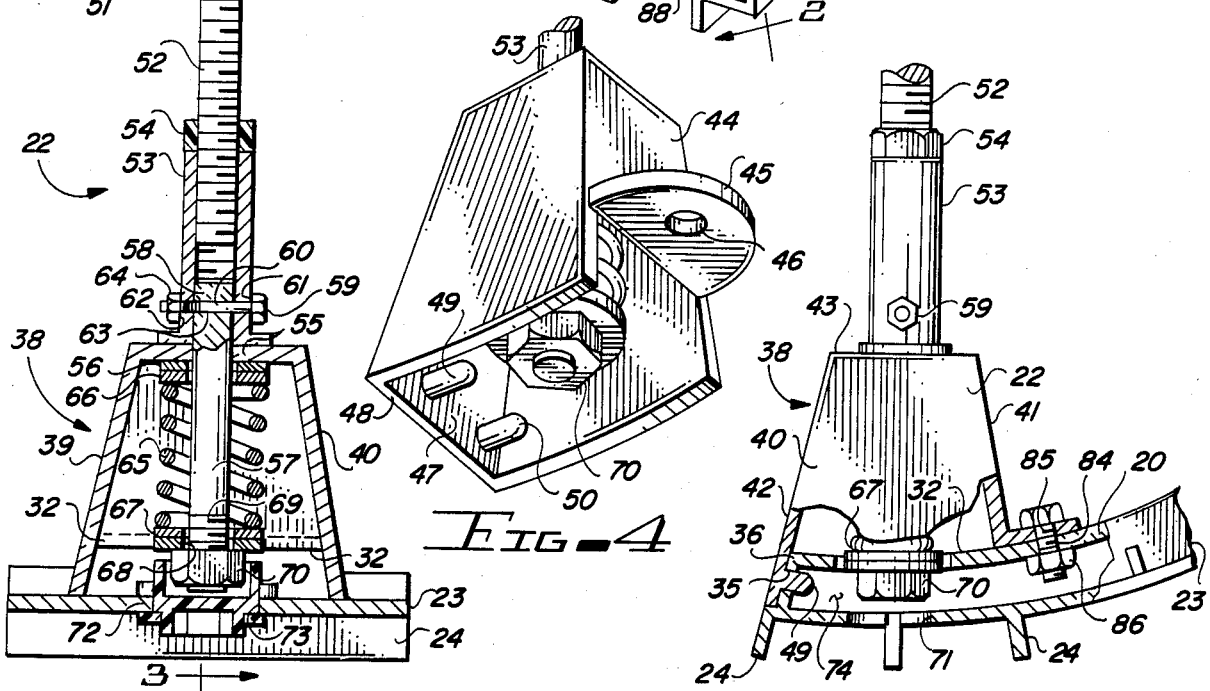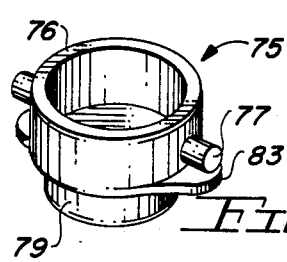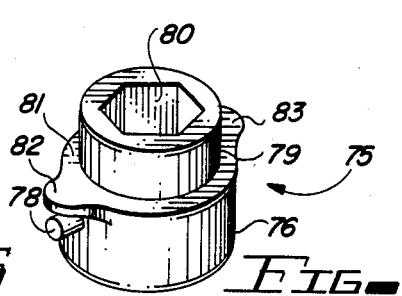

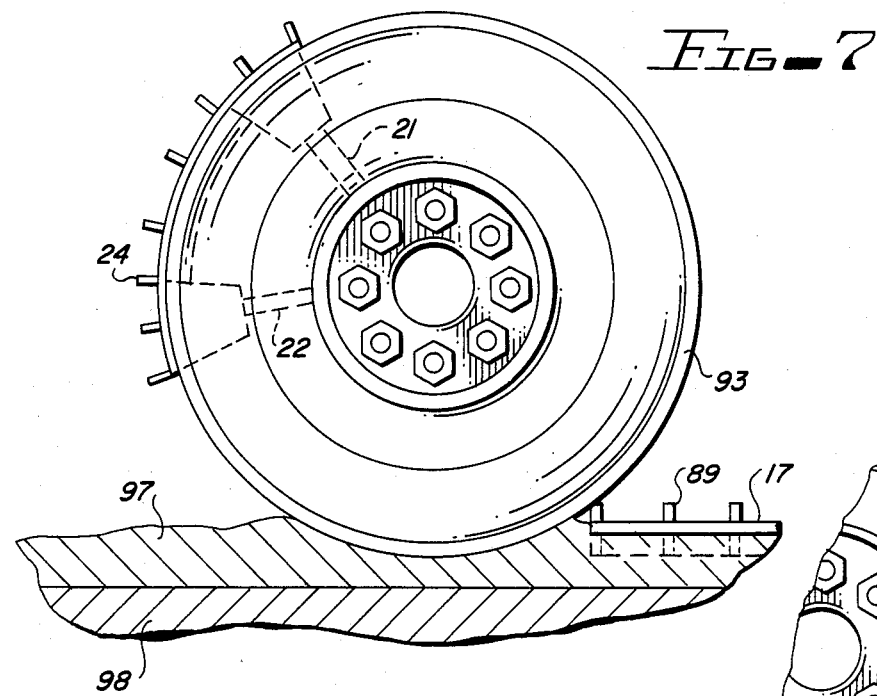
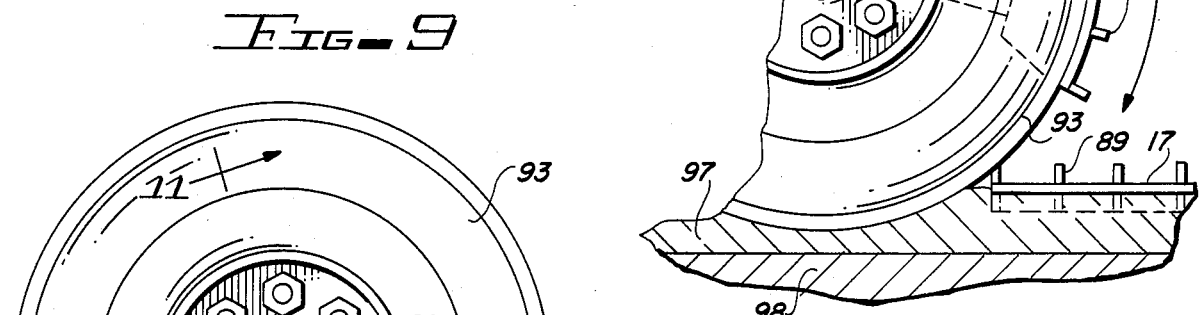
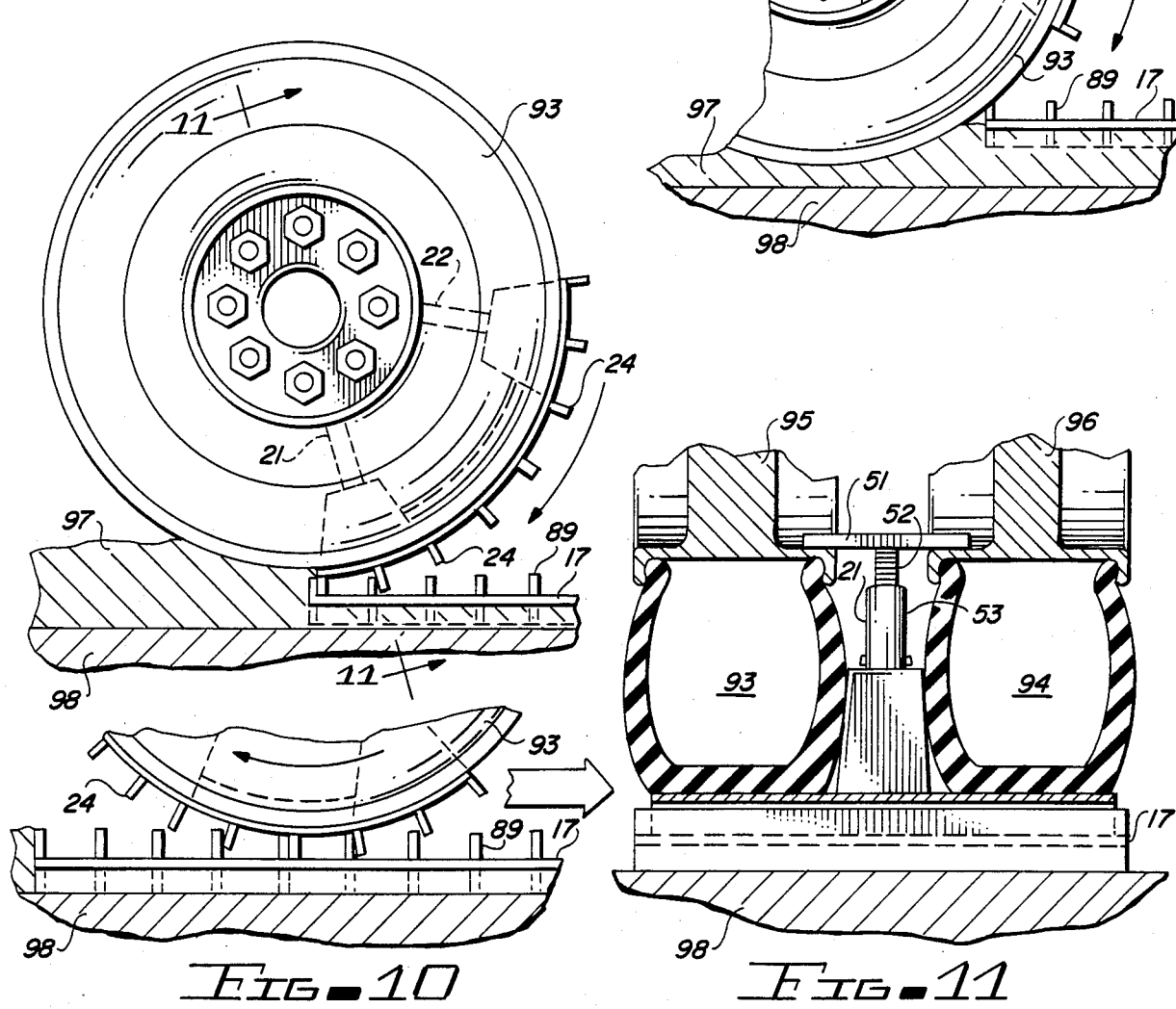

VEHICLE HAVING A DUAL DRIVE WHEEL ASSEMBLY AND TRACTION DEVICE

INTRODUCTION

This invention relates to a traction device and more particularly to a traction device for attachment to and use with dual wheeled vehicles to extricate the vehicle from a mired situation.

BACKGROUND OF INVENTION

The problem of liberating a dual wheeled vehicle from a mired situation in snow, slush, sand, land fills and like materials has long been a vexatious and costly one for the owners and operators of those vehicles.

Several solutions have been proposed throughout the years and have met with varying degrees of success. Many prior art solutions secured traction plates to the distressed wheel by means which extended inwardly between the two tires. For example, Riesen, (U.S. Pat. No. 2,312,486) teaches a traction plate which is secured to a bridge plate that spans the two wheels so that the traction plate is secured against the outer periphery of the tires. Another, Pletch, (U.S. Pat. No. 2,454,005), teaches the attachment of a traction plate to the dual wheels by means of a tension plate having a shaft-mounted cam arranged therewith so that as the shaft is rotated, the traction plate is moved relative to the outer peripheries of the tires. Silver (U.S. Pat. No. 2,557,241) teaches a traction plate which extends across the outer periphery of the two tires and is bolted to a strap that engages the rims of the dual wheel.

Other prior art devices are described in Sprung (U.S. Pat. No. 986,099, Fogarty (U.S. Pat. No. 1,606,622), McCord (U.S. Pat. No. 3,532,149), Sams (U.S. Pat. No. 3,630,440), Greipel (U.S. Pat. No. 3,672,422), and McCord (U.S. Pat. No. 3,750,734).

While each of the foregoing employed some variant of enhancing of traction between the mired wheel and the natural surface upon which it is stuck or an improvised surface deliberately interposed between the dual wheel and the slippery natural surface, the results obtained were not always predictable or useful, the mass of equipment necessary to effectuate the desired result was not readily transportable, and the contortions required for installation were not practicable.

SUMMARY OF INVENTION

The traction device of the present invention comprises a plate assembly and a block assembly. The block assembly is attached to the mired dual wheel and coacts with the strategically disposed plate assembly and the vehicle gear train to propel the mired vehicle out of its mired position into a free moving position, thereby overcoming the deficiencies heretofore present in the prior art devices.

Accordingly, it is a primary object of the present invention to provide a new and improved traction device for dual wheeled vehicles which is easily installed, reliable in use, and which can be readily stored and transported with the vehicle.

Another object of the present invention is to provide a new and improved traction device having a cleated assembly which is readily attachable to the dual wheel rims and drawable into tight contact with the tire tread and interlockable with a traction plate disposed in operative relationship thereto to free a mired vehicle from its mired condition.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

THE DRAWINGS

In the drawing:

FIG. 1 is an isometric view, partially broken away, of a traction device embodying the present invention;

FIG. 2 is a cross section taken on line 2—2 of FIG. 1;

FIG. 3 is a cross section taken on line 3—3 of FIG. 2;

FIG. 4 is an isometric view, partially broken away, of a tower member embodying the present invention;

FIG. 5 is an isometric view of a cap-wrench device embodying the present invention;

FIG. 6 is an inverted isometric view of the cap-wrench device shown in FIG. 5;

FIG. 7 is a side elevation of a distressed wheel to which a device embodying the present invention has been attached;

FIG. 8 is a fragmented view of the wheel of FIG. 7 after rotation has begun;

FIG. 9 is a side elevation of the wheel of FIGS. 7 and 8 after rotation of the wheel to the moment of engagement between the block assembly and the plate assembly;

FIG. 10 is a fragmented side elevation of the wheel of FIGS. 7, 8 and 9 after traction has been achieved; and FIG. 11 is a cross section taken on line 11—11 of FIG. 9.

DESCRIPTION OF PREFERRED EMBODIMENT

Referring to the drawing, the traction device of the present invention is identified by the general reference 15 and essentially comprises a block assembly 16 and a plate assembly 17.

Each block assembly 16 comprises a body portion 20, a first tower portion 21 and a second tower portion 22. Body portion 20 is formed of a curvilinear plate member 23 having a plurality of transverse flange members 24 extending downwardly therefrom in generally normal relationship thereto and in spaced relationship to each other. On the upper surface 25 of plate member 23 in spaced relationship to each other are mounted a plurality of upstanding cleats 26 to define a row 27 adjacent one edge 28 thereof and a like row 29 of upstanding cleats 26 adjacent the other edge 30 thereof. Optionally, cleats 26 can be segmented cleats disposed in staggered relationship to each other (not shown) to better enhance tire tread engagement as will be hereafter described.

Intermediate cleat rows 27, 29 and centered therebetween is an elevated support member 31 having a generally flat upper surface 32 supported in spaced relationship to plate member 23 by a first side wall 33 and a second side wall 34 integrally secured therebetween.

Each tower portion, for instance tower 22 comprises a trapezoidal housing member 38 supported upon curvilinear plate 23 by side walls 39, 40 which are integrally connected by a proximal end wall 41 and a distal end wall 42, all of which slope inwardly into and are secured by top plate 43.

On the outer surface 44 of proximal end wall 41, that is, the end wall of housing member 38 position toward the center of body portion 16, is secured an outwardly projecting semi-circular flange 45 having a hole 46 bored vertically therethrough for a purpose to be hereinafter described.

On the inner surface 47 of the distal end wall 42 in spaced relationship to the bottom edge 48 are mounted a first and a second inwardly extending prong 49, 50, respectively, adapted to enter and reside in the pair of prong receiving openings 35, (one not shown) which are respectively defined in the end walls 36, (one not shown) of body portion 20 in registered relationship, one to each of said prongs 49, 50.

Each tower further comprises a handle means 51 having a threaded rod 52 integrally formed therewith dependent therefrom for threaded insertion into an internally threaded sleeve 53 through threaded nylon member 54 (optional). Sleeve 53 extends downwardly to an outreaching flange or collar 55 integrally formed therewith into seating engagement with top plate 43. Beneath top plate 43 is disposed thrust washer 56 which circumscribes a lower rod member 57. Lower rod member 57 has an upper threaded portion 58 which is inserted into for threaded engagement with sleeve member 53 and is secured in a preselected position relative thereto by detachable securing means 59. A suitable securing means 59 is provided by a bolt 60 which is passed through registered openings 61, 62 drilled through cylindrical sleeve 53 and a corresponding hole 63 drilled through rod 57 in registry with openings 61, 62 where nut 64 is secured thereto.

Compression spring 65 is operatively circumscribed about lower rod member 57 between an upper washer 66 and lower washer 67. Upper washer 66 abuts thrust washer 56 while lower washer 67 passes through opening 68 defined in surface 32 to expose lower threaded end 69 of rod 57 for engagement by an adjustable threaded fastener, such, for example, as hex nut 70.

An enlarged circular opening 71 having diametrically opposed slots 72, 73 extending outwardly therefrom is cut through plate 23. Opening 71 is centered on the longitudinal axis of rod 57 to provide suitable access into that chamber 74 defined between plate 23 and surface 32 within tower housing 38.

A suitable combination slush cap and wrench device 75 is shown in FIGS. 5 and 6. Device 75 comprises an annular upper portion 76 having a first and a second cylindrical plug, 77, 78, respectively, extending outwardly therefrom in diametrically opposed positions relative to each other, an annular lower portion 79 having a hexagonal cavity 80 defined therein complementary to hex nut 70 and operative to receive hex nut 70 therewithin for adjustment thereof as shall be hereinafter described. Intermediate annular portions 76 and 79 is an outwardly extending flange 81 circumscribing the annular portions and presenting a first ear member 82 and a second ear member 83, extending in diametrically opposite directions from flange 81 for purposes to be hereinafter described. In climates where snow and sleet are the principal source of vehicular mire, a modified device 75 is preferred in which the annular lower portion 79 is replaced with an upstanding flange which complements flanges 24 in engaging the problem surface 97.

First tower member 21 is constructed in an identical manner to tower member 22 and will not be separately described.

Tower members 21, 22 prior to installation upon the dual wheeled vehicle, are connected to body portion 20 to complete the block assembly 16 in the following fashion.

Prongs 49, 50 are respectively inserted into corresponding prong receiving openings 35, (one not shown) in ends walls 41, 42, (one not shown) of body portion 20 so that tower housing 38 snugly abuts therewith and the hole 46 in flange 45 is brought into registry with a hole 84 defined through upper plate 32 whereupon bolt 85 is passed therethrough and rotated for threaded engagement in a threaded nut 86 which is disposed beneath plate 32 in registry with hole 84 and, preferably is tack welded or otherwise suitably secured thereto.

With the towers 21, 22 each attached to body portion 20 in the manner described, block assembly 16 is completed and ready for installation upon the disabled vehicle in the manner to be hereinafter described.

Plate assembly 17 as shown in FIGS. 1 and 7–10 comprises a relatively flat rectangular plate member 88 having a plurality of upstanding transverse flanges 89 integrally formed on the upper surface 90 thereof in spaced relationship to each other and adapted for cooperative engagement with flanges 24 as will hereinafter appear. Plate assembly 17 further comprises a plurality of generally normal downwardly extending cleats 91 extending downwardly from and integrally secured to the lower surface 92 of plate 88.

When a vehicle having dual wheels 93, 94 is mired in slush, mud, sand or the like and cannot be extricated therefrom by the vehicle's own motive power, the device 15 hereof is installed in the following manner.

The several pieces of each tower 21, 22 are withdrawn from the kit or vehicle cab in which they are stored and each tower assembly, for example, tower 22 is assembled by placing tower housing 38 on a surface and turning handle means 51 to introduce and advance rod 52 into the upper end of threaded sleeve 53. Normally, housing 38 will carry compression spring 65 in circumscription about lower rod member 57 between washers 66, 67 and secured by hex nut 70 on the one end and securing means 59 on the other when stored. The procedure is repeated to assemble tower 21. When tower assemblies 21, 22 are completely assembled in the manenr described, tower assemblies 21, 22 are then respectively mounted onto body portion 20 by inserting their respective prongs 49, 50 into the corresponding prong receivers 35, bringing holes 45 into alignment with the corresponding hole 84 and passing the respective bolt 85 therethrough into tight threaded engagement with the nut 86 associated therewith.

When the block assembly 16 is thus assembled, each handle means 51 is turned in sleeve 53 until each is essentially parallel to their corresponding cleat rows 27, 29. Next the assembly 16 is raised toward wheels 93, 94 so that the tower handles 51, oriented as described, are advanced inwardly between the wheels 93, 94 until the handles 51 are in line with tire rims 95, 96 respectively.

Next, slush cap-wrench 75 is removed by rotating the cap 75 until plugs 77, 78 are respectively aligned with slots 72, 73 and cap 75 can be readily removed therefrom.

Cap-wrench 75 is then inverted and reinserted into chamber 74 through opening 71 until hexagonal cavity 80 engages hex nut 70 whereupon cap-wrench 75 is rotated in a clockwise direction to advance hex nut 70 upwardly on threaded rod portion 69, the effect of which is to turn handle means 51 into hooking engagement with rims 95, 96 whereupon handle means 51 ceases to turn and the further rotation of hex nut 70 serves to draw down on rod 52, sleeve 53, and rod 57 and compress spring 65 between washers 66, 67 while simultaneously drawing curvilinear plate 23 toward and clear rows 27, 29 into tight engagement with the tread on tires 93, 94. When the hex nut 70 appears incapable of being further advanced, cap-wrench 75 is removed from chamber 74, inverted, and returned to chamber 74, by passing plugs 77, 78 up through slots 72, 73 and then rotating cap 75 until plugs 77,78 engage the upper surface of plate 23 and flange 81 with ears 82, 83 engage the lower surface thereof.

With the block assembly 16 thus mounted on the tires 93, 94, the plate assembly 17 is disposed upon the slippery surface 97 which covers the firmer ground 98 adjacent the edge of the tire on the side toward which movement is desired (see FIG. 7). Next, the vehicle operator places his vehicle into gear and applies power to rotate the tires and the block assembly 16 secured thereto toward the plate assembly 17 (see FIG. 8) with ultimate engagement occurring between flanges 24 and 89 (see FIG. 9). At this moment further rotation of tires causes the block assembly 16 to literally walk along plate assembly 17 thereby removing the mired vehicle from its mired condition.

When the vehicle is thus extricated, the plate assembly 17 is picked up, cleaned, and returned to storage. Next, slush cap 75 is removed from block assembly 16 by rotating the member 75 until plugs 77, 78 are in alignment with slots 72, 73 and the cap 75 can be readily withdrawn from chamber 74, cleaned, inverted, and reinserted until hexagonal cavity 80 engages hex nut 70. The cap-wrench 75 is then rotated in a counter-clockwise direction to unscrew hex nut 70 and loosen the firm engagement between handle means 51 and rim 95, 96 while relaxing the compression in spring 65. When block assembly 16 is completely free, hex nut 70 is further turned to turn handle means 51 free of rims 95, 96 whereupon the entire assembly is withdrawn from between the wheels 93, 94 and placed on the ground for further diassembly which is obtained by unscrewing bolt 85 from nut 86 and withdrawing it from hole 84.

With bolt 85 thus withdrawn, each tower 21, 22 is removed from body portion 20 by disengaging prongs 49, 50 from prong receptors 35. Body portion 20 is thus ready for cleaning and storage. Towers 21, 22 can, if desired, be further disassembled by unscrewing rod 52 from sleeve 53 and storing the handle-rod assemblage separate for the remainder of the tower assembly.

From the foregoing it becomes readily apparent that the traction device herein described and illustrated fulfills all of the aforestated objectives in a remarkably unexpected fashion. It is of course understood that such modifications, alterations and adaptations as will readily occur to the artisan confronted with the disclosure are intended within the spirit of the present invention which is limited only by the scope of the claims appended hereto.

What is claimed is:

1. In a vehicle having a dual drive wheel assembly each wheel assembly having an axle, a first and second rim mounted on the axle, and a tire mounted in circumscription about each rim, a device for providing traction when said vehicle is mired in a first tractionless position to enable said vehicle to be driven from said first position to a second free moving position, said device comprising: a block assembly and a plate assembly; said block assembly being attachable to said rims within said wheel assembly to secure said block assembly in a fixed position relative to said vehicle wheels for rotation therewith in response to motive power applied thereto, said block assembly having a plate member for engaging a portion of the periphery of said tires in shape conforming relationship thereto, said plate member having a plurality of cleat members extending radially outwardly therefrom; said plate assembly having a body member, a first set of cleats extending upwardly from said body member and a second set of cleats extending downwardly from said body member, said plate assembly being juxtaposed to said wheel assembly in the path of intended travel with said second set of cleats engaging said miring material and said first set of cleats positioned to engage said cleat members of said block assembly as said block assembly cleat members are rotated with said wheel assembly in response to a motive power applied thereto and draw said wheel assembly from its initial tractionless position into a second free moving position.

2. A device according to claim 1 in which said block assembly comprises a first and second tower member secured to said plate member in spaced cooperative relationship to each other, each of said tower members extending upwardly from said plate member between said dual wheels for selective engagement with said rims.

3. A device according to claim 2 in which said plate member has a curvilinear contour and has a plurality of transverse flange members extending downwardly therefrom.

4. A device according to claim 2 in which said plate member comprises a plurality of transverse flange members extending downwardly from the lower surface thereof and a plurality of cleat members extending upwardly from the upper surface thereof for operative engagement with the tread on each of said tires.

5. A device according to claim 1 in which said block assembly comprises a curvilinear plate member having an upper surface and a lower surface, said lower surface having a plurality of transverse flange members extendng downwardly therefrom, said upper surface having a plurality of cleats extending upwardly therefrom adjacent each edge thereof; a support member operatively disposed in spaced secure relationship to said upper surface intermediate said cleats, a first tower member, and a second tower member, each of said tower members being independently secured to said support member and extending upwardly therefrom between said dual wheels for selective engagement with the rims thereof.

6. A device according to claim 5 in which each of said tower members comprise a housing member, having an opening on the upper surface thereof, a lower rod member disposed within said housing member and having a threaded upper portion extending upwardly through said opening; a hollow internally threaded sleeve member seated upon said housing member and receiving said threaded upper portion of said lower rod therewithin, detachable securing means extending diametrically across said sleeve through said upper portion of said lower rod to secure said rod to said sleeve; a compression spring operatively circumscribed about said lower rod within said housing; handle means having a threaded rod portion depending therefrom engageable for engagement within said sleeve and responsive to the movement thereof to orient said handle means for passage to and engagement by said rim; flange means detachably securable to said support member to integrally unite said plate member, said support member and said tower housings into a unitary structure.

7. A device according to claim 6 in which said block assembly rotates with said tires in response to a motive power applied thereto and said downwardly extending transverse flange members engage said first set of cleats on said plate member of said plate assembly.

* * * * *